US012404709B2

(12) United States Patent
Chen

(10) Patent No.: US 12,404,709 B2
(45) Date of Patent: Sep. 2, 2025

(54) ADJUSTABLE PULLEY STRUCTURE FOR SHOWER ROOM

(71) Applicant: Zhongshan Wellbo Sanitary Co., Ltd., Zhongshan (CN)

(72) Inventor: Shengquan Chen, Zhongshan (CN)

(73) Assignee: Zhongshan Wellbo Sanitary Co., Ltd., Zhongshan (CN)

(*) Notice: Subject to any disclaimer, the term of this patent is extended or adjusted under 35 U.S.C. 154(b) by 65 days.

(21) Appl. No.: 18/387,493

(22) Filed: Nov. 7, 2023

(65) Prior Publication Data

US 2025/0092726 A1 Mar. 20, 2025

(30) Foreign Application Priority Data

Sep. 20, 2023 (CN) ......................... 202311217941.6

(51) Int. Cl.
*E05D 15/06* (2006.01)
*E05D 13/00* (2006.01)

(52) U.S. Cl.
CPC .............. *E05D 13/00* (2013.01); *E05D 15/06* (2013.01); *E05Y 2201/688* (2013.01); *E05Y 2900/114* (2013.01)

(58) Field of Classification Search
CPC ... E05D 15/06; E05D 15/063; E05D 15/0634; E05D 15/0639; E05D 15/0643; E05D 15/14; E05Y 2201/688; E05Y 2201/69; E05Y 2201/692; E06B 9/08; E06B 9/171; E05B 3/02; E05B 3/46; E05B 3/4681; F16H 1/16
USPC ..................... 16/96 R; 74/89.1, 89.23, 89.45
See application file for complete search history.

(56) References Cited

U.S. PATENT DOCUMENTS

| | | | | | |
|---|---|---|---|---|---|
| 334,344 | A | * | 1/1886 | Bullard | E05D 15/0634 16/98 |
| 352,529 | A | * | 11/1886 | Ewing | E05D 15/0634 16/105 |
| 813,399 | A | * | 2/1906 | Browne | E05D 15/063 16/98 |
| 2,417,114 | A | * | 3/1947 | Kilham | G01D 5/02 74/89.45 |
| 2,553,761 | A | * | 5/1951 | Gooding | B23B 29/03407 407/112 |

(Continued)

FOREIGN PATENT DOCUMENTS

CN 218716047 U * 3/2023

*Primary Examiner* — Emily M Morgan
(74) *Attorney, Agent, or Firm* — Bay State IP, LLC

(57) ABSTRACT

The present disclosure discloses an adjustable pulley structure for a shower room, which includes a mounting structure and a pulley assembly, wherein the mounting structure includes a mounting seat, a gland, a mounting column, a worm gearing structure and an adjustment screw; an end surface of the mounting seat is integrally formed with a convex block with an adjusting strip-shaped concave cavity; the convex block is provided with a transverse perforation, and the convex block is provided with a vertical through hole communicated with the transverse perforation; the mounting column is provided in the adjusting strip-shaped concave cavity, the adjusting screw is in threaded connection with the vertical through hole, the worm gearing structure is connected with the adjusting screw; and the pulley assembly is fixed on the mounting column.

7 Claims, 6 Drawing Sheets

(56) References Cited

U.S. PATENT DOCUMENTS

| | | | | | |
|---|---|---|---|---|---|
| 2,912,714 | A * | 11/1959 | Rich | E05D 15/0669 16/DIG. 34 |
| 3,105,272 | A * | 10/1963 | Tucker, Jr. | E05D 15/0634 49/411 |
| 5,070,575 | A * | 12/1991 | Redman | E05D 15/0639 16/98 |
| 6,185,784 | B1 * | 2/2001 | Gamperle | E05D 15/0634 16/99 |
| 11,208,833 | B2 * | 12/2021 | Tarrega Klein | E05D 5/02 |
| 11,492,831 | B2 * | 11/2022 | Kao | E05D 15/0634 |
| 2004/0098831 | A1 * | 5/2004 | Elmer | E05D 15/063 16/89 |
| 2006/0207184 | A1 * | 9/2006 | Whitaker | E05D 15/063 49/409 |
| 2011/0072614 | A1 * | 3/2011 | Luedke | E05D 15/0634 16/97 |
| 2012/0222267 | A1 * | 9/2012 | Desrosiers | E05F 5/003 16/82 |
| 2013/0020035 | A1 * | 1/2013 | Pelakanos | E05D 15/0634 160/181 |
| 2016/0265258 | A1 * | 9/2016 | Bouthillier | E05D 15/0652 |
| 2020/0208451 | A1 * | 7/2020 | Tarrega Klein | E05D 15/06 |
| 2021/0062562 | A1 * | 3/2021 | Kao | E06B 3/4681 |
| 2025/0052101 | A1 * | 2/2025 | Braga | E05D 15/0634 |

* cited by examiner

ADJUSTABLE PULLEY STRUCTURE FOR SHOWER ROOM

CROSS REFERENCE TO RELATED APPLICATION

This application claims the benefit of and takes priority from Chinese Patent Application No. 202311217941.6 filed on Sep. 20, 2023, the contents of which are herein incorporated by reference.

TECHNICAL FIELD

The present disclosure belongs to the technical field of pulley structures for a shower rooms, in particular to an adjustable pulley structure for a shower rooms.

BACKGROUND

There are two main ways to open doors in traditional shower rooms, namely, sliding doors and side-hung doors, in which sliding doors are more widely used. Sliding doors are mainly mounted by mounting pulleys on movable doors and guide rails in a shower room, so as to realize the push-pull movement of glass doors by sliding a pulley back and forth on the guide rail. In the sliding process of the pulley on the rail, the pulley will vibrate up and down, so that the sliding doors cannot move normally. In order to solve this problem, it is generally necessary to mount anti-jump devices separately after the pulley is mounted on the guide rail, which increases the mounting cost and affects the overall aesthetics of the sliding door. Moreover, the disassembly and assembly operation is also inconvenient.

The Chinese patent with the publication number of CN218716047U entitled as HIDDEN ANTI-HOOK PULLEY ASSEMBLY FOR SHOWER ROOM relates to the technical field of shower room pulleys, and includes a front-end main body in sliding fit with a shower room guide rail and a rear-end main body for fixing a pulley assembly on a glass door, wherein the rear-end main body and the front-end main body are arranged at intervals, and a pressure plate is provided between the rear-end main body and the front-end main body; the front end main body includes a hub in rolling fit with the shower room guide rail, a front cover plate provided at one side of the hub and in sliding fit with the shower room guide rail, and a rear cover plate provided at the other side of the hub.

Although the use requirements of general situations can be satisfied to a certain extent, in the actual application process, due to the reason of a door frame guide rail or under the action of gravity, the pulley assembly cannot slide effectively if the pulley assembly is slightly sagging. Therefore, it is necessary to adjust the pulley assembly to ensure the smoothness of the connection with the door frame guide rail, but the above technology cannot realize the adjustment operation, so that the applicability and the practicability are limited.

SUMMARY

The purpose of the present disclosure is to provide an adjustable pulley structure for a shower room, which is reasonable in structural arrangement and beneficial to improving the convenience and smoothness of adjustment.

The technical scheme for realizing the purpose of the present disclosure is an adjustable pulley structure for a shower room, including a mounting structure and a pulley assembly, the mounting structure includes a mounting seat, a gland, a mounting column, a worm gearing structure and an adjusting screw;

an end surface of the mounting seat is integrally formed with a convex block with an adjusting strip-shaped concave cavity;

the convex block is provided with a transverse perforation, the convex block is provided with a vertical through hole communicated with the transverse perforation, and the vertical through hole is provided in the same direction as an axis of the pulley assembly;

the mounting column is provided in the adjusting strip-shaped concave cavity, and the worm gearing structure penetrates through the transverse perforation;

the adjusting screw is in threaded connection with the vertical through hole, and the worm gearing structure is connected with the adjusting screw;

the pulley assembly is fixed on the mounting column;

the gland is fixed on the mounting seat by screws.

Further preferably, the worm gearing structure includes a stud and a locking gear fixed at an end of the stud;

the stud penetrates through the transverse perforation, and a rack of the locking gear is engaged with a thread of the adjusting screw;

the adjusting screw rotates and realizes movement adjustment of the mounting column in the adjusting strip-shaped concave cavity through the locking gear.

Further preferably, the mounting structure further includes a door leaf clamping structure;

the door leaf clamping structure is provided between the gland and the mounting seat, and the door leaf is positioned in the door leaf clamping structure.

Further preferably, a circular cavity is provided on a side surface of the mounting seat far away from the pulley assembly;

an adjusting disc is provided in the circular cavity;

a circular recessed area is provided on a side surface of the adjusting disc, and an inner wall of the circular recessed area is evenly provided with tooth grooves;

a transmission gear is fixed on the adjusting screw, and the transmission gear is located in the circular recessed area and is engaged with the tooth groove.

Further preferably, a decorative cover is provided on a side surface of the mounting seat, and the screw passes through the mounting seat and is fixed with the decorative cover;

the decorative cover is provided with an adjusting hole position;

an adjusting nut is fixed at a middle part of the side surface of the adjusting disc, and the adjusting hole position is matched with the adjusting nut.

Further preferably, the door leaf clamping structure includes an inner splint and an outer splint;

an avoidance through hole matched with a shape of the convex block is provided at a middle part of the inner splint and the outer splint;

side surfaces of the inner splint and the outer splint are both provided with abutting convex strips;

the abutting convex strips of the inner splint and the outer splint are clamped on an inner wall of a hole of the door leaf, and the inner splint and the outer splint are abutted against symmetrical side surfaces of the door leaf, respectively, and are abutted and positioned by the gland and the mounting seat.

Further preferably, a diameter of the transmission gear is smaller than an inner diameter of the circular recessed area.

Further preferably, the pulley assembly includes a pulley seat, a bearing and a pulley body;

the pulley seat is fixed on a side surface of the mounting column by screws, and the pulley body is fixed on the pulley seat by bearings.

Further preferably, an end surface of the pulley seat is buckled with a protective cover.

Further preferably, the mounting column includes a square column and a circular ring, a circular protrusion is provided on the square column, the circular ring is sleeved on the circular protrusion, the pulley seat is attached to a side surface of the circular ring, and screws pass through the pulley seat and the circular ring and are screwed with the circular protrusion;

a width of the square column is matched with a width of the adjusting strip-shaped cavity, and a length of the square column is small than a length of the adjusting strip-shaped cavity;

the transverse perforation is provided in a length direction of the adjusting strip-shaped cavity.

The present disclosure has the following positive effects. The present disclosure is reasonable in structure, and is provided with a mounting structure. The mounting structure includes a mounting seat, a gland, a door leaf clamping structure, a mounting column, a worm gearing structure and an adjusting screw, which not only can quickly realize the mounting and positioning of a door leaf. Moreover, the adjustment locking limit is realized through the worm gearing structure matched with the adjusting screw, which can effectively prevent the adjusting screw from automatically rotating due to vibration in the use process, thus avoiding the door leaf from loosening and sagging. The present disclosure is beneficial to improving the use smoothness and reliability, strong in applicability and excellent in practicability.

Moreover, the adjusting disc is matched with the transmission gear on the adjusting screw, so that the adjusting precision can be improved. During adjustment, when the adjusting disc rotates by a large angle, the adjusting screw only rotates by a small range, so that the adjusting precision can be improved. When the pulley assembly sags or loosens when it is used for a long time, the position adjustment of the pulley assembly can be realized by the rotation of the adjusting screw, so that the use smoothness and reliability of the pulley assembly can be ensured, which is also beneficial to improving the precision, smoothness and reliability of the adjustment position.

BRIEF DESCRIPTION OF THE DRAWINGS

In order to make the contents of the present disclosure more clearly understood, the present disclosure will be further described in detail hereinafter according to specific embodiments and the attached drawings, in which.

Figure 1:
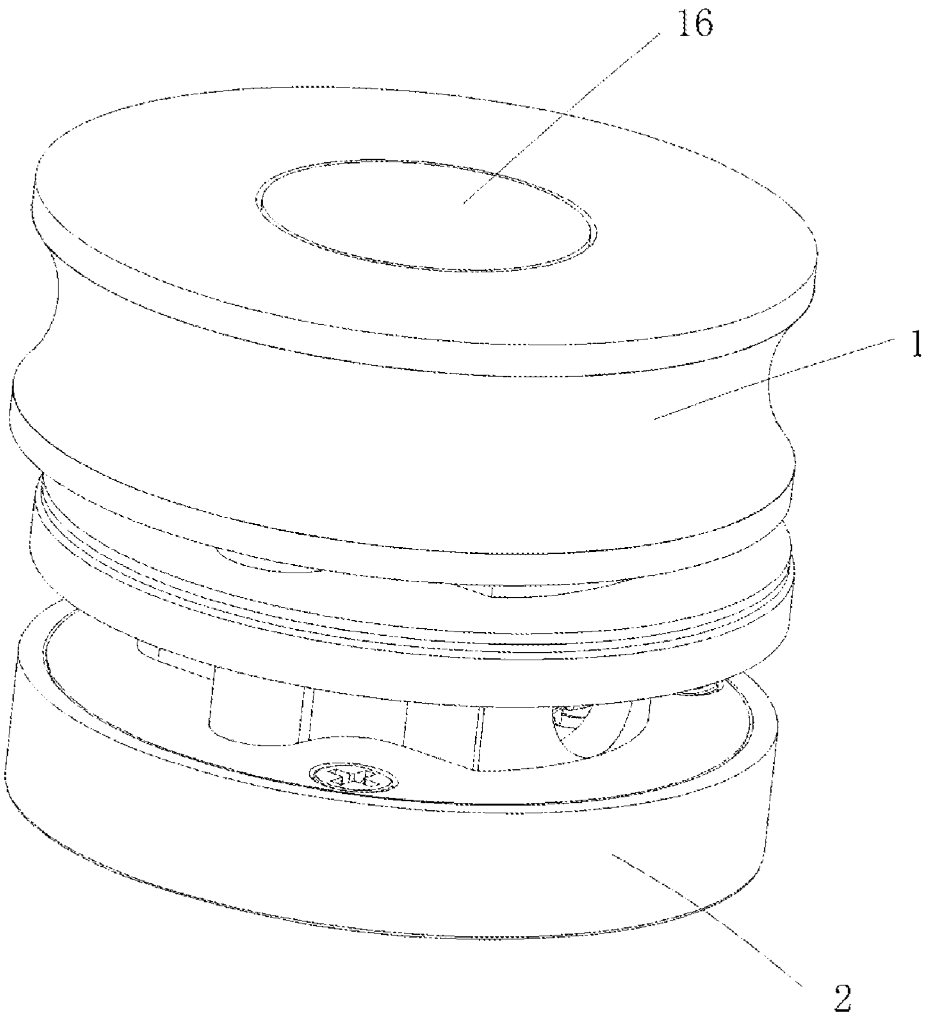
FIG. 1 is a schematic structural diagram of the present disclosure.

Reference numerals: pulley assembly 1, pulley seat 1-1, bearing 1-2, pulley body 1-3, mounting structure 2, mounting seat 21, gland 22, door leaf clamping structure 23, inner splint 231, outer splint 232, avoidance through hole 233, abutting convex strip 234, mounting column 24, worm gearing structure 25, stud 251, locking gear 252, adjusting screw 26, adjusting strip-shaped cavity 3, convex block 4, transverse perforation 5, vertical through hole 6, screw 7, circular cavity 8, adjusting disc 9, circular recessed area 10, tooth groove 11, transmission gear 12, decorative cover 13, adjusting hole position 14, adjusting nut 15, protective cover 16

DETAILED DESCRIPTION OF THE EMBODIMENTS

The technical scheme in the embodiment of the present disclosure will be clearly and completely described with reference to the attached drawings hereinafter. Obviously, the described embodiments are only some embodiments of the present disclosure, rather than all of the embodiments. Based on the embodiments in the present disclosure, all other embodiments obtained by those skilled in the art without creative labor belong to the scope of protection of the present disclosure.

Embodiment 1

Figure 2:
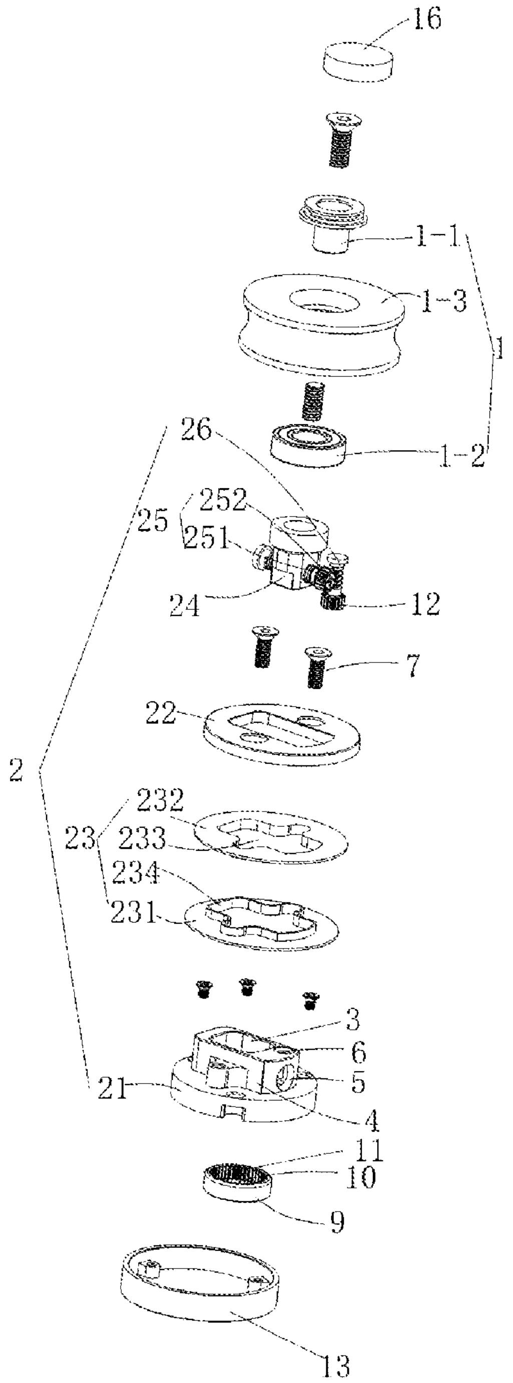
FIG. 2 is a schematic diagram of a splitting structure of the present disclosure.
Figure 3:
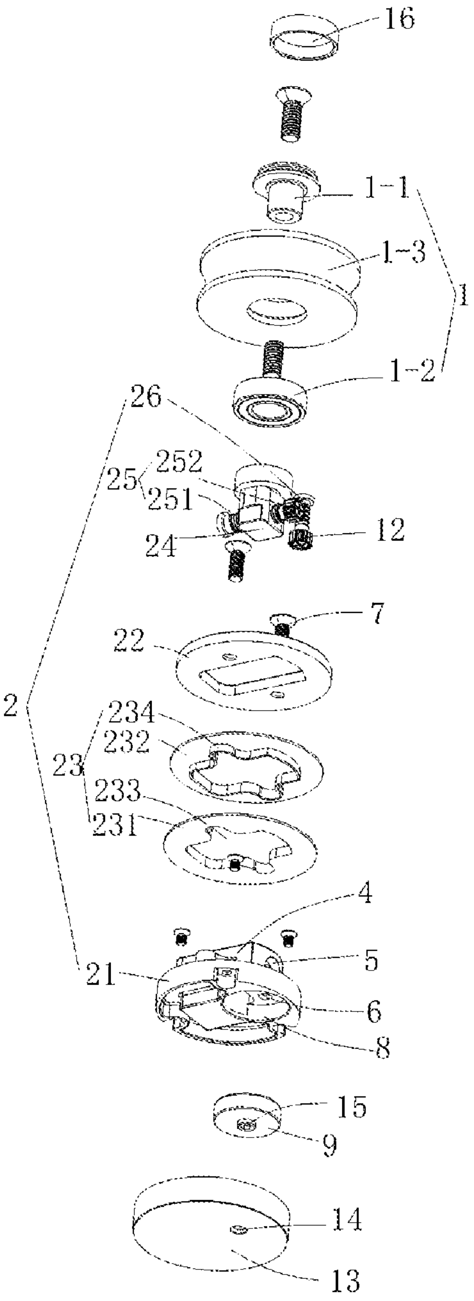
FIG. 3 is structural diagram of FIG. 2 from another view.
Figure 4:
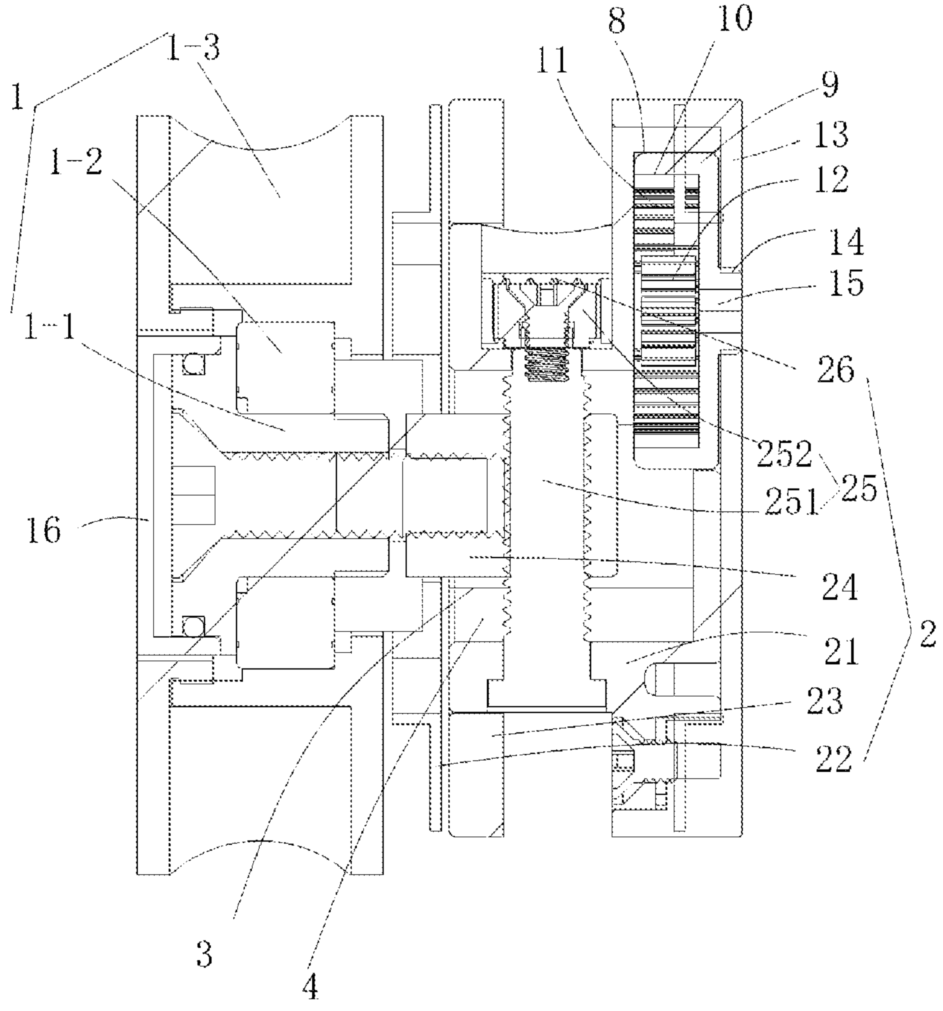
FIG. 4 is a cross-sectional schematic structural diagram of the present disclosure.
Figure 5:
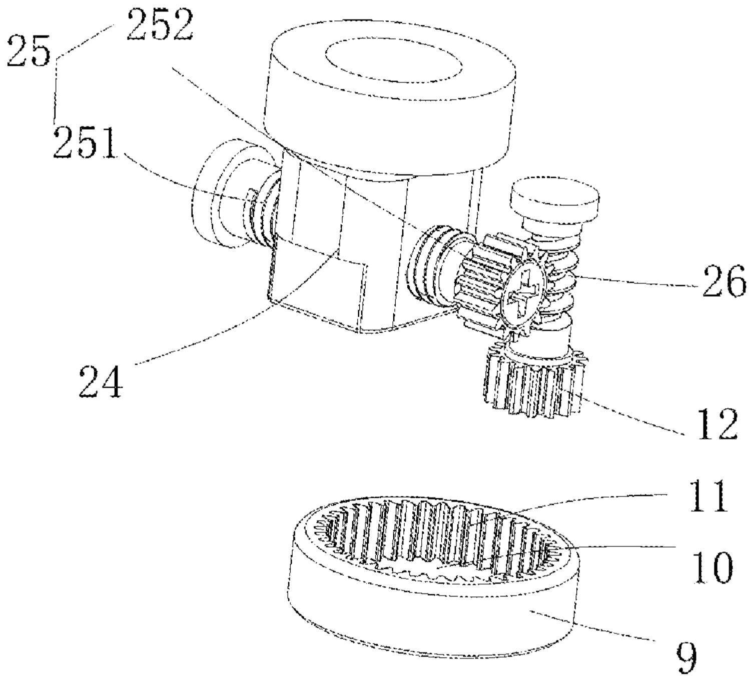
FIG. 5 is a schematic diagram of a connection structure between an adjusting disc, and an adjusting screw and a worm gearing structure according to the present disclosure.
Figure 6:
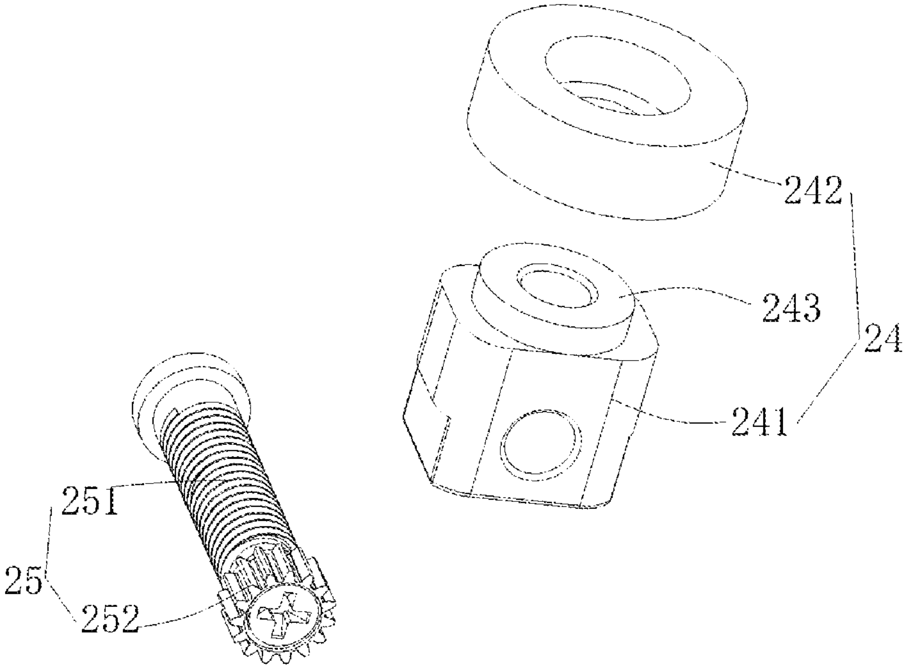
FIG. 6 is a schematic diagram of a specific structure of a mounting column shown in FIG. 5.

As shown in FIG. 1 to FIG. 6, an adjustable pulley structure for a shower room includes a mounting structure 2 and a pulley assembly 1. The mounting structure is fixed on the mounting hole of the door leaf and is fixedly connected with the door leaf, and the pulley assembly is connected to the mounting structure and is matched with the sliding rail of the door frame to realize sliding adjustment.

The mounting structure 2 includes a mounting seat 21, a gland 22, a door leaf clamping structure 23, a mounting column 24, a worm gearing structure 25 and an adjusting screw 26. In this embodiment, the door leaf clamping structure is mainly used for be clamped on the symmetrical side surfaces of the door leaf. At the same time, the gland is matched with the mounting seat, so that the door leaf clamping structure can be positioned and fixed, thus ensuring the smoothness and reliability of the mounting position.

In this embodiment, the mounting column 24 includes a square column 241 and a circular ring 242. A circular protrusion 243 is provided on the square column. The circular ring is sleeved on the circular protrusion. The pulley seat is attached to a side surface of the circular ring, and screws pass through the pulley seat and the circular ring and are screwed with the circular protrusion. The circular ring is beneficial to the normal use of the pulley assembly and can reduce the friction between the pulley assembly and the mounting column.

An end surface of the mounting seat is integrally formed with a convex block 4 with an adjusting strip-shaped concave cavity 3. In this embodiment, the adjusting strip-shaped cavity is mainly used for the mounting and positioning of the mounting column. The mounting column can also be adjusted and used in the adjusting strip-shaped cavity. When in use, the mounting column can be buffered and adjusted in the adjusting strip-shaped cavity. The mounting columns are provided in a square shape. A width of the square column is matched with a width of the adjusting strip-shaped cavity, and a length of the square column is small than a length of the adjusting strip-shaped cavity. The transverse perforation is provided in a length direction of the adjusting strip-shaped cavity.

The convex block is provided with a transverse perforation 5. The convex block is provided with a vertical through hole 6 communicated with the transverse perforation, and the vertical through hole is provided in the same direction as an axis of the pulley assembly. In this embodiment, the transverse perforation is provided vertically to the vertical through hole. The transverse perforation is mainly used to mount the worm gearing structure, while the vertical through hole is mainly used to mount the adjusting screw. The adjusting screw is mainly used to adjust the worm gearing structure, so as to realize the adjustment of the pulley assembly, which can effectively prevent the adjusting screw from automatically rotating due to vibration in the use process, thus avoiding the door leaf from loosening and sagging. The present disclosure is beneficial to improving the use smoothness and reliability.

During mounting, the mounting column is provided in the adjusting strip-shaped concave cavity, and the worm gearing structure penetrates through the transverse perforation. The adjusting screw is in threaded connection with the vertical through hole, and the worm gearing structure is connected with the adjusting screw. The pulley assembly is fixed on the mounting column. The adjustment operation of the pulley assembly can be realized by the adjusting screw, which is beneficial to improving the convenience of adjustment. Because the position adjustment of the pulley assembly can be realized through the worm gearing structure when the adjusting screw rotates, the effectiveness and smoothness of adjustment are improved.

At the same time, the gland is fixed on the mounting seat by screws 7. The door leaf clamping structure is provided between the gland and the mounting seat, and the door leaf is positioned in the door leaf clamping structure. By matching the door leaf clamping structure with the gland and the mounting seat, the smoothness and reliability of the mounting with the door leaf can be ensured.

The worm gearing structure 25 includes a stud 251 and a locking gear 252 fixed at an end of the stud. The stud penetrates through the transverse perforation, and a rack of the locking gear is engaged with a thread of the adjusting screw. Because the adjusting screw is engaged with the locking gear, the adjusting screw cannot rotate due to the engagement of the adjusting screw with the locking gear in the vibration process in use, which can effectively prevent the adjusting screw from automatically rotating due to vibration, thus avoiding the door leaf from loosening and sagging, ensuring the use smoothness and reliability, and ensuring the mounting position precision. The adjusting screw rotates and realizes movement adjustment of the mounting column in the adjusting strip-shaped concave cavity through the locking gear. However, the locking gear is always engaged with the thread of the adjusting screw, which improves the smoothness of use.

In this embodiment, a circular cavity 8 is provided on a side surface of the mounting seat far away from the pulley assembly; an adjusting disc 9 is provided in the circular cavity; a circular recessed area 10 is provided on a side surface of the adjusting disc, and an inner wall of the circular recessed area is evenly provided with tooth grooves 11; a transmission gear 12 is fixed on the adjusting screw, and the transmission gear is located in the circular recessed area and is engaged with the tooth groove. A diameter of the transmission gear is smaller than an inner diameter of the circular recessed area. When the adjusting disc rotates, the adjusting screw can be finely adjusted through the transmission gear. Because the adjusting disc rotates in a larger range, the adjusting screw can only rotate in a smaller range, so that the adjustment precision can be improved. Through the adjusting screw and the worm gearing structure, the fine adjustment of the pulley assembly is realized, so that the precision and smoothness are improved. Because the locking gear of the worm gearing structure is engaged with the teeth of the adjusting screw, the locking state can be realized, and the adjusting screw will not automatically rotate in normal use, ensuring the precision, smoothness and reliability of the use position.

A decorative cover 13 is provided on a side surface of the mounting seat, and the screw passes through the mounting seat and is fixed with the decorative cover; the decorative cover is provided with an adjusting hole position 14; an adjusting nut 15 is fixed at a middle part of the side surface of the adjusting disc, and the adjusting hole position is matched with the adjusting nut.

In this embodiment, a screwdriver and other tools can be used to pass through the adjusting hole position and connect with the adjusting nut. The adjusting disc is driven to rotate by the adjusting nut. The transmission gear is driven to act by the tooth groove, so as to realize the knob adjustment of the adjusting screw, thereby realizing the depth adjustment of the mounting column in the adjusting strip-shaped concave cavity, that is, realizing the distance adjustment between the pulley assembly and the mounting structure, and meeting the use requirements of different situations.

The door leaf clamping structure 23 includes an inner splint 231 and an outer splint 232. An avoidance through hole 233 matched with a shape of the convex block is provided at a middle part of the inner splint and the outer splint; side surfaces of the inner splint and the outer splint are both provided with abutting convex strips 234; during mounting, the abutting convex strips of the inner splint and the outer splint are clamped on an inner wall of a hole of the door leaf, and the inner splint and the outer splint are abutted against symmetrical side surfaces of the door leaf, respectively, and are abutted and positioned by the gland and the mounting seat. By using this structure, the mounting smoothness of the inner splint, the outer splint and the door leaf is ensured. In the practical application process, the inner splint and the outer splint can be plastic structures or metal structures.

The pulley assembly 1 includes a pulley seat 1-1, a bearing 1-2 and a pulley body 1-3; the pulley seat is fixed on a side surface of the mounting column by screws, and the pulley body is fixed on the pulley seat by bearings. In order to improve the overall decorative performance, an end surface of the pulley seat is buckled with a protective cover 16.

The present disclosure is reasonable in structure, and is provided with a mounting structure. The mounting structure includes a mounting seat, a gland, a door leaf clamping structure, a mounting column, a worm gearing structure and an adjusting screw, which not only can quickly realize the mounting and positioning of a door leaf. Moreover, the adjustment locking limit is realized through the worm gearing structure matched with the adjusting screw, which can effectively prevent the adjusting screw from automatically rotating due to vibration in the use process, thus avoiding the door leaf from loosening and sagging. The present disclosure is beneficial to improving the use smoothness and reliability, strong in applicability and excellent in practicability.

Moreover, the adjusting disc is matched with the transmission gear on the adjusting screw, so that the adjusting precision can be improved. During adjustment, when the adjusting disc rotates by a large angle, the adjusting screw only rotates by a small range, so that the adjusting precision can be improved. When the pulley assembly sags or loosens when it is used for a long time, the position adjustment of the pulley assembly can be realized by the rotation of the adjusting screw, so that the use smoothness and reliability of the pulley assembly can be ensured, which is also beneficial to improving the precision, smoothness and reliability of the adjustment position.

The standard parts used in this embodiment can be available directly from the market, and the non-standard structural parts recorded in the specification can also be processed directly according to the existing technical knowledge without any doubt. At the same time, the connection mode of each part uses the mature conventional means in the prior art, while the machines, parts and devices use the conventional models in the prior art, which will not be described in detail here.

Obviously, the above embodiments of the present disclosure are only examples for clearly explaining the present disclosure, rather than limitations to the implementation of the present disclosure. For those skilled in the art, other changes or variations in different forms can be made on the basis of the above description. It is not necessary and impossible to exhaust all the embodiments here. However, these obvious changes or variations which are derived from the true spirit of the present disclosure still belong to the scope of protection of the present disclosure.

What is claimed is:

1. An adjustable pulley structure for a shower room, comprising a mounting structure and a pulley assembly, wherein: the mounting structure comprises a mounting seat, a gland, a mounting column, a worm gearing structure and an adjusting screw; an end surface of the mounting seat is integrally formed with a block with a cavity;

the block is provided with a transverse perforation, the block is provided with a vertical through hole communicated with the transverse perforation, and the vertical through hole is provided in the same direction as an axis of the pulley assembly;

the mounting column is provided in the cavity, and the worm gearing structure penetrates through the transverse perforation;

the adjusting screw is in threaded connection with the vertical through hole, and the worm gearing structure is connected with the adjusting screw;

the pulley assembly is fixed on the mounting column;

the gland is fixed on the mounting seat by screws;

wherein the worm gearing structure comprises a stud and a locking gear fixed at an end of the stud;

the stud penetrates through the transverse perforation, the locking gear is engaged with a thread of the adjusting screw;

the adjusting screw rotates and realizes movement adjustment of the mounting column in the cavity through the locking gear;

wherein the mounting structure further comprises a door leaf clamping structure;

the door leaf clamping structure is provided between the gland and the mounting seat, and the door leaf is positioned in the door leaf clamping structure;

wherein a circular cavity is provided on a side surface of the mounting seat far away from the pulley assembly;

an adjusting disc is provided in the circular cavity;

a circular recessed area is provided on a side surface of the adjusting disc, and an inner wall of the circular recessed area is evenly provided with tooth grooves; and a transmission gear is fixed on the adjusting screw, and the transmission gear is located in the circular recessed area and is engaged with the tooth groove.

2. The adjustable pulley structure for the shower room according to claim 1, wherein a decorative cover is provided on a side surface of the mounting seat, and the screw passes through the mounting seat and is fixed with the decorative cover;

the decorative cover is provided with an adjusting hole position;

an adjusting nut is fixed at a middle part of the side surface of the adjusting disc, and the adjusting hole position is matched with the adjusting nut.

3. The adjustable pulley structure for the shower room according to claim 2, wherein the door leaf clamping structure comprises an inner splint and an outer splint;

a through hole matched with a shape of the convex block is provided at a middle part of the inner splint and the outer splint;

side surfaces of the inner splint and the outer splint are both provided with abutting convex strips;

the abutting convex strips of the inner splint and the outer splint are clamped on an inner wall of a hole of the door leaf, and the inner splint and the outer splint are abutted against symmetrical side surfaces of the door leaf, respectively, and are abutted and positioned by the gland and the mounting seat.

4. The adjustable pulley structure for the shower room according to claim 3, wherein a diameter of the transmission gear is smaller than an inner diameter of the circular recessed area.

5. The adjustable pulley structure for the shower room according to claim 1, wherein the pulley assembly comprises a pulley seat, a bearing and a pulley body;

the pulley seat is fixed on a side surface of the mounting column by screws, and the pulley body is fixed on the pulley seat by the bearing.

6. The adjustable pulley structure for the shower room according to claim 5, wherein an end surface of the pulley seat is buckled with a protective cover.

7. The adjustable pulley structure for the shower room according to claim 6, wherein the mounting column comprises a square column and a circular ring, a circular protrusion is provided on the square column, the circular ring is sleeved on the circular protrusion, the pulley seat is attached to a side surface of the circular ring, and screws pass through the pulley seat and the circular ring and are screwed with the circular protrusion;

a width of the square column is matched with a width of the cavity, and a length of the square column is small than a length of the cavity;

the transverse perforation is provided in a length direction of the cavity.

* * * * *